United States Patent
Finkenzeller et al.

(10) Patent No.: US 7,209,014 B2
(45) Date of Patent: Apr. 24, 2007

(54) SWITCHING DEVICE ACTUATED BY A TRANSPONDER

(75) Inventors: Klaus Finkenzeller, Munich (DE); Christoph Schiller, Munich (DE)

(73) Assignee: Giesecke & Devrient GmbH, Munich (DE)

(*) Notice: Subject to any disclaimer, the term of this patent is extended or adjusted under 35 U.S.C. 154(b) by 0 days.

(21) Appl. No.: 10/504,779

(22) PCT Filed: Feb. 5, 2003

(86) PCT No.: PCT/EP03/01144

§ 371 (c)(1),
(2), (4) Date: Feb. 16, 2005

(87) PCT Pub. No.: WO03/069538

PCT Pub. Date: Aug. 21, 2003

(65) Prior Publication Data

US 2005/0156752 A1 Jul. 21, 2005

(30) Foreign Application Priority Data

Feb. 18, 2002 (DE) ................ 102 06 676

(51) Int. Cl.
*H03B 5/00* (2006.01)

(52) U.S. Cl. ............... 331/117 FE; 331/167; 340/540; 340/542; 340/545.4; 340/10.1; 340/825.71

(58) Field of Classification Search ............... 340/10.4, 340/825.71, 10.1, 545.4, 542, 540; 331/74, 331/167, 117 R, 117 FE, 34
See application file for complete search history.

(56) References Cited

U.S. PATENT DOCUMENTS 6,150,948 A 11/2000 Watkins
6,703,920 B2 * 3/2004 Zimmer .................. 340/10.34

FOREIGN PATENT DOCUMENTS

| DE | 198 55 207 C | 5/2000 |
|----|-----|-----|
| EP | 1 024 451 A | 8/2000 |
| JP | 11-066444 | 3/1999 |

* cited by examiner

*Primary Examiner*—Arnold Kinkead
(74) *Attorney, Agent, or Firm*—Rothwell, Figg, Ernst & Manbeck, PC

(57) ABSTRACT

Proposed is a device actuated by a transponder for the generation of a switch signal. The device is based on an oscillating circuit (10) with a capacitance ($C_1$), an identification coil ($L_1$) and an oscillator amplifier (12). Connected to the oscillating circuit (10) is a frequency observer (20) which evaluates the frequency ($f_1$) tuned in the oscillating circuit (10) and which when finding a change emits a switch signal (S). A change of the frequency in the oscillating circuit (10) is effected by the approach of a transponder (60). The device permits a nearly loadless transponder identification.

18 Claims, 3 Drawing Sheets

SWITCHING DEVICE ACTUATED BY A TRANSPONDER

CROSS-REFERENCE TO RELATED APPLICATION

This application is a National Phase of International Application Ser. No. PCT/EP03/01144, filed Feb. 5, 2003.

FIELD OF THE INVENTION

The invention starts out from a device of the species of the main claim. A device of this kind is known from DE 198 55 207 C1. Therein a transponder reading apparatus is described which can be switched on by a switch signal generated by bringing near a ferromagnetic element to an identification coil so as to induce a voltage in the latter. The identification coil is provided specifically for triggering the switching process and is formed around a permanent magnet. The ferromagnetic element together with the transponder is placed on a code carrier which can be for example a key. The device permits the transponder reading apparatus to be switched on by the mere approach of the code carrier without this code carrier having to possess an own power supply. The device requires the continuous operation of an amplifying circuit used for the amplification of the voltage induced in the identification coil. Here no-load operation losses do arise which have to be continuously equalized by the power supply. The operation of the device therefore requires a sufficiently large power supply. If the power supply has to be dimensioned very small, the device cannot be used or only with restrictions.

DESCRIPTION OF THE BACKGROUND ART

One widespread transponder application are contactless portable data carriers which cooperate with a reading device that contains a coil, with the help of which the reading device performs the power supply for the transponder brought into the response range and the readout. As to be able to identify the bringing near of a transponder the reading device cyclically at short time intervals produces a magnetic field which is suitable for supplying a transponder with power that, optionally, is brought within the addressing range. At the same time the reading device usually sends out one interrogation signal at a time with which a transponder is addressed. The regular production of magnetic field and interrogation signal causes a comparatively high energy consumption which renders the concept unsuitable for applications in which a sufficiently large power supply cannot be made available.

Furthermore, in DE 100 06 747 A1 can be seen a generic device which especially deals with the problem of power consumption. It is proposed to equip a portable transponder element with a permanent magnet which when approached to a reading apparatus actuates a switch disposed therein that is controlled by a magnet. The proposed device minimizes the power consumption of the reading apparatus since the latter can remain completely switched off during the absence of a transponder. The installation of a permanent magnet requires constructional measures regarding the transponder elements to be equipped with such a magnet, and such measures cannot always be taken easily. The mechanic integration is problem enough as to render the solution not suitable for, for example, contactless chip cards. Furthermore, the magnetic field produced by a permanent magnet often is undesirable with regard to the practical usability of the transponders equipped with such permanent magnets. This applies for example to portable data carriers in chip card format where information is stored on a magnetic stripe. The handling of such transponders is also restricted in so far as they have to be kept away from other circuits sensitive to magnetic fields.

The book "RFID-Handbuch" written by K. Finkenzeller, Carl Hanser Verlag, 2nd edition, 2000, describes in detail the basic principles of the transponder technology and shows examples of transponder applications. In particular chapter 4 of this book gives basic information and additional explanations to the invention described hereinafter. Explicit reference is made to these passages in particular and to the book as a whole, they shall be part of this application.

From DE 196 02 316 C1 there is known a device for the transmission of data and supply power from/to a transponder which can be used for example in a theft protection system of a motor vehicle. The device has a fixed transceiver as well as a portable transponder which when approached to the transceiver cooperates with it. To achieve a power or data transmission as effective as possible it is proposed after the manufacturing of the transceiver to adjust the resonant frequency in the transmitting antenna circuit and/or the quantity of the exciting current flowing in the transmitting antenna circuit in such a manner that the result is a maximum power transmission to the transponder. The found adjustment is fixed by circuit-technical means.

From DE 199 23 367 A1 a device for the non-contacting position recording of an object is known which has a transmitting antenna, a receiving antenna and an evaluation circuit. Here transmitting antenna and receiving antenna influence each other. With the presence of an object their coupling changes. The change is recorded and evaluated.

SUMMARY OF THE INVENTION

It is the problem of the invention to specify a switching device actuated by a transponder which enables a power consumption as low as possible within the connected circuit and at the same time unrestricted use.

This problem is solved by a device with features of the main claim. According to the invention the generation of a switch signal and with that a switching process is triggered upon detection of the detuning of the resonant frequency of an oscillating circuit. The oscillating circuit and the circuit required for the identification can be operated nearly loadless. Accordingly, the inventive switching device shows an extraordinarily low power consumption. Therefore, it is especially suitable for the actuating of circuits, the power supply of which comes from a limited power source. In particular it is suitable for supplying circuits powered by small batteries. Since the device is to a far extend independent of the size of the provided power source, a flexible use in a multitude of installation places is possible for which the device otherwise would not be suitable. The device is suitable, inter alia, for installing in door locking apparatus, so as to enable a transponder-aided, non-contacting opening of the door.

Furthermore, the inventive device is very user-friendly because it requires no special handling at all on the part of the user. The transponders used have a conventional form of appearance and are used in the conventional way. The conventional design of the transponders used also has an advantageous effect on their manufacturing since special constructional measures regarding the structure are not required. One further advantage of the inventive device in particular is the fact that the coil which is already present in the transponder triggers the switching and therefore special components in the transponder are not required. Accordingly, the transponders can be of a cost-effective design.

BRIEF DESCRIPTION OF THE DRAWINGS

With reference to the figure one embodiment of the invention is described in more detail in the following.
Figure.

DESCRIPTION

DETAILED DESCRIPTION OF THE INVENTION

Figure 1:
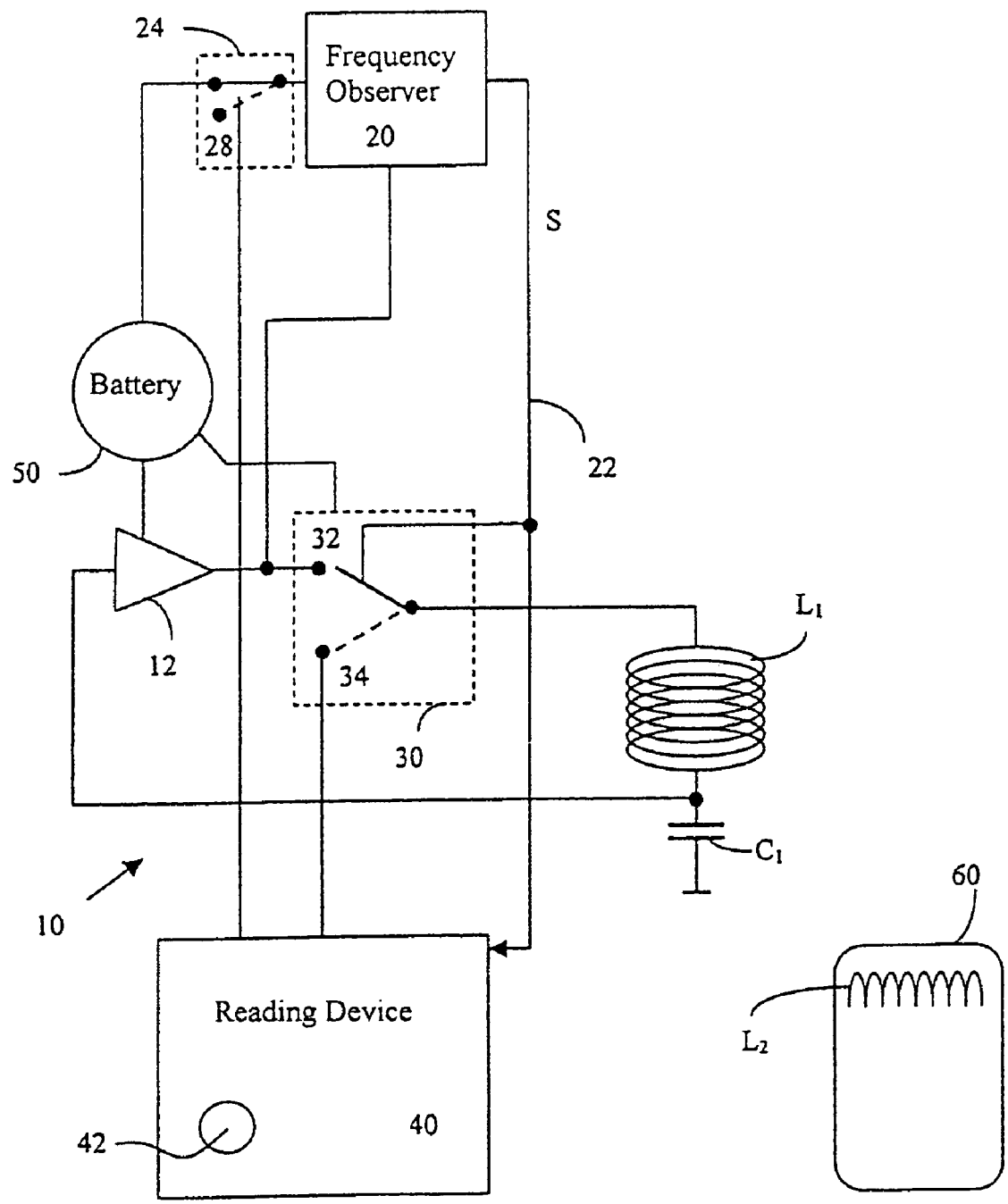
FIG. 1 shows a block diagram of a switching device.

The basic elements of the switching device shown in FIG. 1 are an oscillating circuit 10, a frequency observer 20 connected to the oscillating circuit 10, a switch 30 disposed in the oscillating circuit 10 and actuated by the frequency observer 20, a function circuit 40 connected to the switch 30 and the frequency observer 20 as well as a transponder 60 for triggering the switching process. A further basic element is a power source 50 which supplies the oscillating circuit 10, the frequency observer 20 and the switch 30 with power.

The oscillating circuit 10 is composed of an identification coil $L_1$, a capacitance $C_1$, and an oscillator amplifier 12. A further component of the oscillating circuit 10 is the switch 30. The identification coil $L_1$ and the capacitance $C_1$ determine the resonant frequency $f_1$ of the oscillating circuit 10. The oscillator amplifier 12 expediently has the form of a feedback coupling transistor amplifier. It keeps the oscillating circuit 10 in tune to the resonant frequency $f_1$ and equalizes the arising power losses caused by the identification coil $L_1$ and the capacitance $C_1$, as well as, if any, further present components. For this purpose it is connected to the power source 50.

The frequency observer 20 contains a circuit which allows the identification of changes in the resonant frequency $f_1$ tuned in the oscillating circuit 10. For this purpose the circuit is preferably formed as an amplitude sensing element, as a phase sensing element or as a frequency sensing element. When the frequency observer 20 identifies a detuning of the resonant frequency $f_1$ in the oscillating circuit 10 it generates a switch signal S which addresses via a control line 22 the switch 30 and the function circuit 40.

The power supply of the frequency observer 20 is effected by the power source 50 the frequency observer is connected to for this purpose. This connection is expediently effected via a switch 24 which is actuated by the function circuit 40. Having been switched on by a switch signal S the function circuit 40 by means of the switch 24 disconnects the frequency observer 20 from the power supply 50 for the period of time the communication with a transponder 60 lasts. Upon completion of a communication with a transponder 60 the function circuit 40 switches on the frequency observer 20 by means of reconnecting it with the power source 50 by activating the switch 24.

The switch 30 can be of any constructional type. In its normal position 32 it closes the oscillating circuit 10 as outlined in FIG. 1. Having received a switch signal S via the control line 22 it changes into the position 34 and connects the identification coil $L_1$ with the function circuit 40.

The function circuit 40 in principle can be formed by any circuit which can be addressed by a switch signal S. In the embodiment it is assumed that the function circuit 40 is a transponder reading device working contactlessly which after a communication with a transponder 60 either triggers or not triggers a function. In view of the advantages achievable by means of the described device it is furthermore assumed that the function circuit 40, in the following referred to as reading device, has an own power source 42 in the form of a battery. For carrying out a communication with a transponder 60 the reading device 40 is connectable to the identification coil $L_1$ by moving the switch 30 into the position 34. It is switched on by a control signal S supplied via the control line 22. Furthermore, the reading device 40 can be connected to a switch 24 disposed between power source 50 and frequency observer 20 through which the frequency observer 20 can be switched on and off by either being connected or being not connected to the power source 50.

The power source 50 expediently has the form of a battery. It effects the power supply for the oscillator amplifier 12, the frequency observer 20 and the switch 30. The power source 50 can form a constructional unit with the power source 42 and in particular can also be formed by a single power source such as a single battery.

The transponder 60 is of a conventional constructional type and acts, for example, as a carrier of a code which is verified by the reading device 40. For example it has the form of a portable data carrier in the format of a standard chip card. But it can also be of any other constructional design, such as a wristwatch or a writing implement. Essential component of the transponder 60 in view of the device described herein is a transponder coil $L_2$. By means of such a transponder coil a switching process can be triggered.

The basic function of the device described in FIG. 1 is a magnetic reverse coupling M which occurs between identification coil $L_1$ and transponder coil $L_2$, if the two are brought into sufficient proximity to each other. The reverse coupling M here occurs without an active involvement of the transponder 60, the transponder 60 does not need to supply energy. By means of the reverse coupling M an impedance ZT is transformed in the identification coil $L_1$. The coupling of the impedance ZT leads to a change in the resonance conditions in the oscillating circuit 10. The result is a change in the resonant frequency $f_1$ of the oscillating circuit 10. Here the coupled impedance ZT is not dependent on the quantity of the current $I_1$ flowing in the oscillating circuit 10. Therefore, the current can be adjusted to a value of nearly 0 when the components of the oscillating circuit are suitably dimensioned.

To the coupled impedance ZT the following applies $$Z_T = \omega^2 k^2 L_1 L_2 (R_2 + j\omega L_2 + R_L/(1+j\omega R_L C_2))^{-1} \quad (1)$$

while for the magnetic coupling M between identification coil $L_1$ and transponder coil $L_2$ applies $$M = k(L_1 L_2)^{1/2}.$$

A derivation of the relation (1) for the transformed impedance $Z_T$ can be found in "RFID-Handbuch", K. Finkenzeller, 2nd edition, 2000, in particular chapter 4.1.10 already mentioned in the introduction. Especially referring to this book, from a detailed derivation is refrained at this point.

Figure 2:
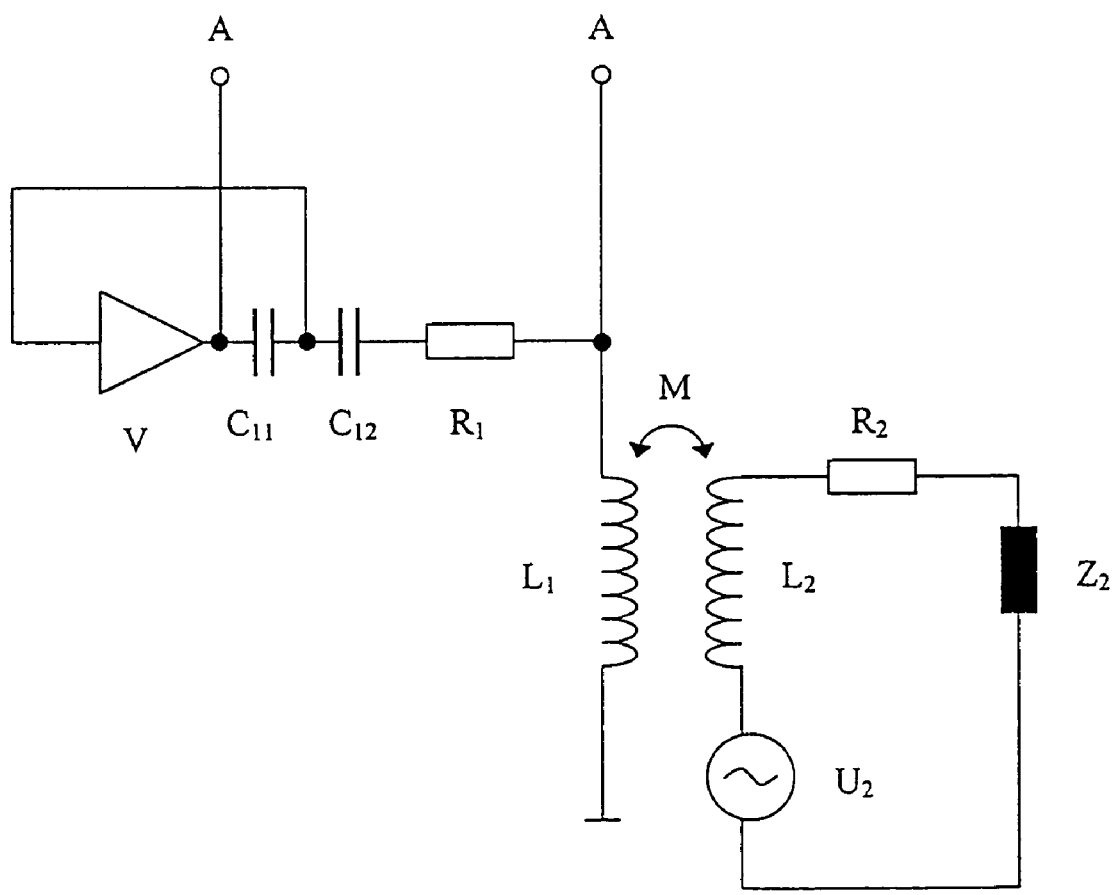
FIG. 2 shows an equivalent diagram of a part of the switching device.

As to explain the meaning of the relation (1) FIG. 2 shows an equivalent diagram of the oscillating circuit 10 and the transponder 60. The oscillating circuit 10 comprises the identification coil $L_1$, an ohmic resistance $R_1$ assigned to the identification coil $L_1$, a feedback coupling amplifier V as oscillator amplifier 12, as well as a total capacitance $C_1$ which consists of a first partial capacitance $C_{11}$ to cause a division of the voltage for the feedback coupling, as well as a second partial capacitance $C_{12}$ for tuning the resonant frequency. The components of the oscillating circuit 10 are preferably dimensioned in such a manner that the identification coil $L_1$ and the capacitance $C_1$ to a large extend alone determine the resonant frequency $f_1$ of the oscillating circuit 10.

As to achieve an effect as large as possible $L_1$ and $C_1$ are preferably chosen in such a manner that the off-load oscillating circuit 10 works exactly on the resonant frequency of a corresponding transponder 60. In this case a maximum value is achieved for ZT, as a result of which the identification of a detuning by the frequency observer 20 is improved.

Following usual transponder solutions typical resonant frequencies $f_1$ tuned in the oscillating circuit 10 and also used by the transponder 60 range below 135 kHz. But in principle any other frequency ranges are also suitable, e.g. the frequency of 13.56 MHz relevant for ISO standards.

The transponder 60 consists of the transponder coil $L_2$, a voltage source $U_2$, a transponder impedance $Z_2$, and an ohmic resistance $R_2$ of the transponder coil $L_2$. The transponder impedance $Z_2$ is composed of a load resistor $R_L$ and a capacitance $C_2$. The voltage source $U_2$ generates the voltage which is induced due to the magnetic coupling M in the transponder coil $L_2$ by the current $I_1$ flowing in the identification coil $L_1$.

Figure 3:
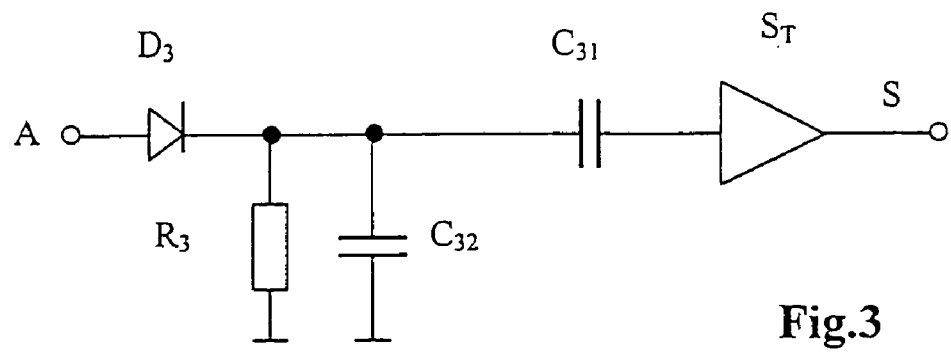
FIG. 3 shows an equivalent diagram of a frequency observer.

FIG. 3 shows an equivalent diagram of a possible frequency observer 20. It is connected to the oscillating circuit 10 at one of the connecting points A. The basis of the shown frequency observer 20 is formed by a differentiating circuit which comprises a diode $D_3$, a differentiating capacitance $C_{31}$ connected in series, as well as a parallel circuit consisting of a resistance $R_3$ and a capacitance $C_{32}$ through which the output of the diode $D_3$ is connected to ground. The output of the differentiating capacitance $C_{31}$ forms the input of a Schmitt trigger circuit ST, to the output of which an optionally generated signal is presented.

The frequency observer 20 with the circuit depicted in FIG. 3 works as follows. If the off-load oscillating circuit 10 in the absence of a transponder 60 is tuned to a constant oscillation with resonant frequency $f_1$, to the output of the diode $D_3$ will be applied a constant direct voltage which is proportional to the amplitude of the oscillation in the oscillating circuit 10. Via the resistance RB it produces a—minimal—current flow $I_3$, the quantity of which can be adjusted to a value of nearly 0 by a respective dimensioning of the resistance $R_3$.

If a transponder 60 with a transponder coil $L_2$ is moved into the field of the identification coil $L_1$, this approach will effect the coupling of an impedance ZT in the oscillating circuit 10 according to the relation (1). Because of this the resonant frequency $f_1$ and the amplitude of the oscillation in the oscillating circuit 10 change. This temporarily results in an alternating voltage at the output of the diode $D_3$ which changes in accordance with the change in the amplitude, this alternating voltage appears at the differentiating capacitance CB as voltage pulse and effects a short-term impulsive current flow to the Schmitt trigger circuit ST. The voltage pulse causes the Schmitt trigger circuit to emit a switch signal S. The switch signal S now on the one hand effects the switching of the switch 30 to position 34. As a result of this the identification coil L is connected to the reading device 40 and subsequently serves the latter as a power transmitter and communication apparatus for the power supply and communication with the transponder 60. On the other hand the switch signal S switches on the reading device 40.

If a switch 24 exists, the reading device 40, after having been switched on itself, switches off the frequency observer 20 by turning the switch 24 into the position 28. Afterwards the reading device 40 communicates via the coil $L_1$ with the transponder 60. Upon completion of the communication with a transponder 60 the reading device 40 switches on the frequency observer 20 again.

Figure 4:
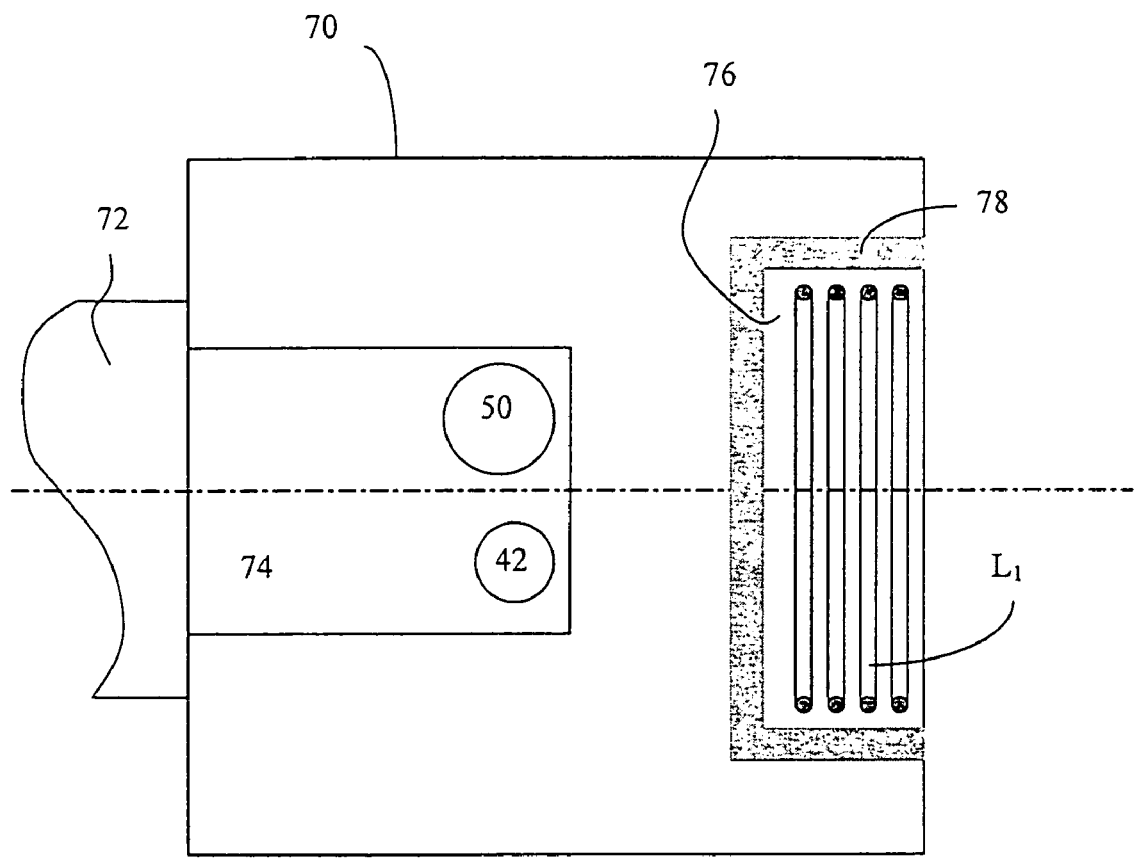
FIG. 4 shows one application of the switching device in a door locking apparatus.

FIG. 4 shows an application of the described switching device in a locking system for doors. A rotatable door knob 70 is depicted which is mounted on a shaft 72 that leads into a door—not shown—and there by means of rotation the shaft enables the unlocking or locking of the door by moving a mechanic interlock means. The door knob 70 inside has a first hollow space 74 for accommodating a first battery 50 which supplies the switching device with power and a second battery 42 which supplies a—not shown—reading device 40 with power. Instead of two batteries 50, 42 a single battery can also be provided which supplies the switching device as well as the reading device 40. Furthermore, on the outer end face facing the user the door knob 70 has a second hollow space 76 wherein an identification coil $L_1$ is disposed. The identification coil $L_1$ according to the variation depicted in FIG. 1 is connected to the reading device 40 via a—also not shown—switch 30 and after the identification of a transponder 60 it serves for the communication with the latter as well as for its power supply.

The door knob 70 is made of a metallic material. As to ensure that the operation of the identification coil 76 is not hindered by losses due to eddy current induction in the door knob material the inner surface of the hollow space 76 is covered with a shielding 78. Suitable materials for the shielding 78 are e.g. ferrite materials or highly permeable metals such as amorphous metals. Furthermore, it can be provided that the identification coil 76 is winded on a ferrite core. This embodiment is particularly advisable in case the resonant frequency $f_1$ in the off-load oscillating circuit 10 is lower than 135 kHz.

In a further, not shown hollow space in the door knob 70 is disposed the reading device 40. As shown in FIG. 1 the reading device 40 for the communication with a transponder 60 preferably uses the identification coil $L_1$ which for this purpose after the identified approach of a transponder 60 is switched via a switch 30 to the reading device 40.

Observing the basic principles of realising a switching device actuated by means of the identification of the detuning of a resonant frequency $f_1$ in a nearly loadlessly operated oscillating circuit 10, the prescribed switching device allows a multitude of designs. This applies to the constructional realisation of the oscillating circuit 10 and the frequency observer 20. The latter in particular can be replaced by any other circuit that permits an observation of the resonance conditions in an oscillating circuit and the changes thereof while consuming a power amount as small as possible. Among other things the frequency observer 20 can be realised using for example a pulse generator such as a monoflop with an output pulse of constant time to which an integrator and a threshold switch are connected in series. A further possible embodiment contains a bandpass filter matched with the resonant frequency $f_1$ to which a rectifier circuit as well as a threshold switch are connected in series. It is also thinkable to provide only a rectifier circuit to which a threshold switch or a window discriminator is connected in series. In the oscillating circuit 10 the tapping of the feedback coupling of the amplifier can be effected at other suitable points, e.g. via the coil. Furthermore, it is not required that the identification coil $L_1$ after addressing the frequency observer 20 via a switch 30 is connected to the reading device 40. It can also be provided that the reading device 40 is equipped with an own coil and a switch signal S optionally transmitted by the frequency observer 20 directly switches on the reading device 40. A switch 30 is omitted in this embodiment. For the switch 24 a multitude of realisation possibilities are suitable. It can be realised, for example, within the frequency observer 20 and it is addressed via the signal line 22. Furthermore, the use of the proposed switching device is not restricted to the application in door locking systems as described by way of example. The device is rather suitable for any other switching situations.

The invention claimed is:

1. A switching device actuated by a transponder for the generation of a switch signal, comprising:
    an oscillating circuit with a capacitance;
    an identification coil; and
    an oscillator amplifier;
    wherein the identification coil and the capacitance determine the resonant frequency of the oscillating circuit,
    a frequency observer which evaluates the frequency tuned in the oscillating circuit and which when finding a change compared with an off-load state generates a switch signal, and
    wherein said device further comprising a switch which either closes the oscillating circuit or connects a function circuit to the identification circuit, said function circuit being formed by any circuit which can be activated by the switch signal.

2. A switching device according to claim 1 characterized in that the switch signal is led via a control line to the function circuit.

3. A switching device according to claim 1 characterized in that the oscillator amplifier and the frequency observer are supplied with power by an independent power source.

4. A switching device according to claim 3 characterized in that the frequency observer is separably connected to the power supply.

5. A switching device according to claim 4 characterized in that the separability is realised by means of the switch which is actuated by the function circuit.

6. A switching device according to claim 1 characterized in that the switch can be actuated by the switch signal of the frequency observer.

7. A switching device according to claim 1 characterized in that the resonant frequency of the oscillating circuit is defined by the identification coil and a capacitance which is connected to the oscillating circuit for this purpose.

8. A switching device according to claim 1 characterized in that the resonant frequency of the oscillating circuit coincides with the resonant frequency of a transponder.

9. A switching device according to claim 1 characterized in that the frequency observer contains a differentiating circuit.

10. A switching device according to claim 1 characterized in that the frequency observer is formed as to identify a change in the phase relationship of the resonance oscillation tuned in the oscillating circuit.

11. A method for switching on a function circuit, comprising utilizing a switching device according to claim 1.

12. A method according to claim 11, characterized in that the function circuit is supplied with power by a limited power source.

13. A system triggering a function with a function circuit which can be switched on by a switch signal characterized in that the generation of the switch signal is effected by a switching device according to claim 1.

14. A system identifying an authorization with a transponder reading device which verifies the authorization of a user by communication and by means of a transponder characterized in that the transponder reading device is connected to a switching device according to claim 1 which switches on the transponder reading device when a transponder has been presented to it.

15. A locking system for a door characterized in that it has a switching device according to claim 1 which switches on, by communication with a transponder, a transponder reading device that verifies the authorization of a user to actuate the locking system.

16. A locking system according to claim 15 characterized in that the identification coil is disposed in a door knob.

17. A locking system according to claim 15, characterized in that the identification coil is disposed in a hollow space, the inside surfaces towards the door knob of which are covered with a shielding.

18. A locking system according to claim 15 characterized in that the shielding is made of a material that prevents losses caused by eddy currents induced in the door knob material.

* * * * *